US008781189B2

(12) United States Patent
Gulsun et al.

(10) Patent No.: US 8,781,189 B2
(45) Date of Patent: Jul. 15, 2014

(54) REPRODUCIBLE SEGMENTATION OF ELLIPTICAL BOUNDARIES IN MEDICAL IMAGING

(75) Inventors: Mehmet Akif Gulsun, Lawrenceville, NJ (US); Marie-Pierre Jolly, Hillsborough, NJ (US)

(73) Assignee: Siemens Aktiengesellschaft, Munich (DE)

( * ) Notice: Subject to any disclaimer, the term of this patent is extended or adjusted under 35 U.S.C. 154(b) by 146 days.

(21) Appl. No.: 13/558,625

(22) Filed: Jul. 26, 2012

(65) Prior Publication Data

US 2013/0094725 A1    Apr. 18, 2013

Related U.S. Application Data

(60) Provisional application No. 61/546,077, filed on Oct. 12, 2011.

(51) Int. Cl.
*G06K 9/00* (2006.01)
*G06K 9/34* (2006.01)
*G06T 7/00* (2006.01)
*A61B 6/00* (2006.01)

(52) U.S. Cl.
CPC ............... *G06K 9/34* (2013.01); *G06T 7/0079* (2013.01); *G06T 7/0012* (2013.01)
USPC ............................... 382/128; 382/199; 378/21

(58) Field of Classification Search
CPC ............. G06K 9/00; G06T 17/20; A61B 6/00
USPC ......... 382/100, 103, 106–107, 128–134, 154, 382/162, 168, 173, 181, 193–194, 199, 232, 382/254, 266, 274, 276, 285, 288–289, 294, 382/305, 312, 175; 345/424, 423; 378/4, 21

See application file for complete search history.

(56) References Cited

U.S. PATENT DOCUMENTS

| | | | | |
|---|---|---|---|---|
| 7,630,549 | B2 * | 12/2009 | Aharon et al. | 382/173 |
| 2007/0248250 | A1 * | 10/2007 | Gulsun et al. | 382/128 |
| 2008/0100621 | A1 * | 5/2008 | Aharon et al. | 345/424 |
| 2008/0240564 | A1 * | 10/2008 | Sun et al. | 382/175 |
| 2009/0278846 | A1 * | 11/2009 | Gulsun et al. | 345/423 |

OTHER PUBLICATIONS

A. V. Goldberg, et al., "A new approach to the maximum-flow problem," Journal of the Association for Computing Machinery, 35(4), pp. 921-940, 1988.
Gulsun, et al., "3D Modeling of Coronary Arteries", Computer Vision for Intravascular and Intracardiac Imaging, MICCAI Workshop 2006.

* cited by examiner

*Primary Examiner* — Seyed Azarian

(57) ABSTRACT

A boundary in a medical image is segmented. To increase reproducibility, a multi-level segmentation approach is used. A boundary is detected based on a seed point. The boundary is used to construct a banded graph. Local segmentation is performed using the banded graph. Based on the local segmentation, a new seed point is found. The local segmentation identifies a consistent location for the seed point. The boundary detection is performed again using the new seed point.

20 Claims, 5 Drawing Sheets

REPRODUCIBLE SEGMENTATION OF ELLIPTICAL BOUNDARIES IN MEDICAL IMAGING

RELATED APPLICATIONS

The present patent document claims the benefit of the filing date under 35 U.S.C. §119(e) of Provisional U.S. Patent Application Ser. No. 61/546,077, filed Oct. 12, 2011, which is hereby incorporated by reference.

BACKGROUND

The present embodiments relate to boundary detection. In particular, a closed boundary is detected in a medical image.

Segmentation of a vessel cross-sectional boundary is used for diagnosis. The area of the vessel may be determined for analysis of a possible stenosis. Vascular research may benefit from segmentation to highlight the location of the vessel or other elliptical structure in a patient. The segmentation can be also used together with functional imaging, such as phase contrast MRI for advanced vascular quantification. Reproducibility of the measurements is important in order to achieve low intra and inter-observer variability for the same clinical data.

One technique with sub-voxel accuracy and efficient running time for the cross-sectional segmentation of vessels is based on a minimum mean cycle optimization method. As disclosed in U.S. Published patent application No. 2007/0248250, the disclosure of which is incorporated herein by reference, a cyclic graph using multi-scale mean-shift edge responses is used to iteratively locate the boundary in an image. The method relies on an input of a single seed point. Other semi-automatic segmentation may also use one or more input seed points.

Semi-automatic vessel cross-sectional segmentation algorithms may be sensitive to the location of the input seed point. Where the spatial domain and/or cost function computations are seed dependent, the segmentation may vary depending on the starting location of the seed. FIGS. 1 and 2 show a same medical image 30. The location of the seed point 32 is different in each medical image. Using the semi-automatic method of U.S. Published patent application No. 2007/0248250 on the two-dimensional image 30 with the different starting location of the seed points 32 results in identification of different boundaries 34. The boundary detection is sensitive to the location of the seed point 32 because of the construction of the cyclic graph around the seed point 32. Other semi-automatic segmentation may be sensitive to the placement of seed points. This sensitivity results in less reproducible results from the segmentation.

BRIEF SUMMARY

By way of introduction, the preferred embodiments described below include methods, systems, instructions, and computer readable media for segmentation of a boundary. To increase reproducibility, a multi-level segmentation approach is used. A boundary is detected based on a seed point. The boundary is used to construct a banded graph. Local segmentation is performed using the banded graph. Based on the local segmentation, a new seed point is found. The local segmentation identifies a consistent location for the seed point. The boundary detection is performed again using the new seed point for more reproducible results.

In a first aspect, a method is provided for segmentation of a boundary. A first boundary is detected in a medical image representing a patient. The detection of the first boundary is a function of an input point. A banded graph is generated based on the first boundary. A second boundary is detected with the banded graph. A center of an area or volume defined by the second boundary is located. A third boundary is detected in the medical image as a function of the center. A second image is displayed and is a function of the third boundary.

In a second aspect, a non-transitory computer readable storage medium has stored therein data representing instructions executable by a programmed processor for segmentation of a boundary. The storage medium includes instructions for extracting an initial boundary with a minimum mean cycle edge detection from a two-dimensional image and a first seed point, performing local segmentation as a function of the initial boundary, computing a second seed point as a function of the local segmentation, and extracting a boundary segment with the minimum mean cycle edge detection from the two-dimensional image and the second seed point.

In a third aspect, a non-transitory computer readable storage medium has stored therein data representing instructions executable by a programmed processor for segmentation of a boundary. The storage medium includes instructions for finding a first boundary of an enclosed shape with a first seed point within the enclosed shape, locating, with banded graph-cuts, a location for a second seed point as a function of the first boundary, and finding a second boundary of the enclosed shape with the second seed point.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

The boundary of a vessel is extracted from a single seed point on a two-dimensional image with accuracy and reproducibility. For example, the boundary is initially extracted with minimum mean cycle optimization using the given seed point. A stable seed point is found using banded graph-cuts based local segmentation initialized with the initially extracted boundary. The final boundary is extracted with minimum mean cycle optimization using the stable seed point. The boundary segmentation operates on medical images and corresponding vessels at any scale.

Reproducible measurement of vessel cross-sectional area, reproducible quantification of stenosis, or reproducible derivation of flow parameters is provided for magnetic resonance (MR) (e.g., phase contrast MR), computed tomography or other medical imaging. The reproducible solution is provided by incorporating a local refinement step using banded graph-cuts optimization. The local refinement step may also improve the accuracy by pulling the initial seed point to the center or other consistent location of the vessel.

Figure 1:
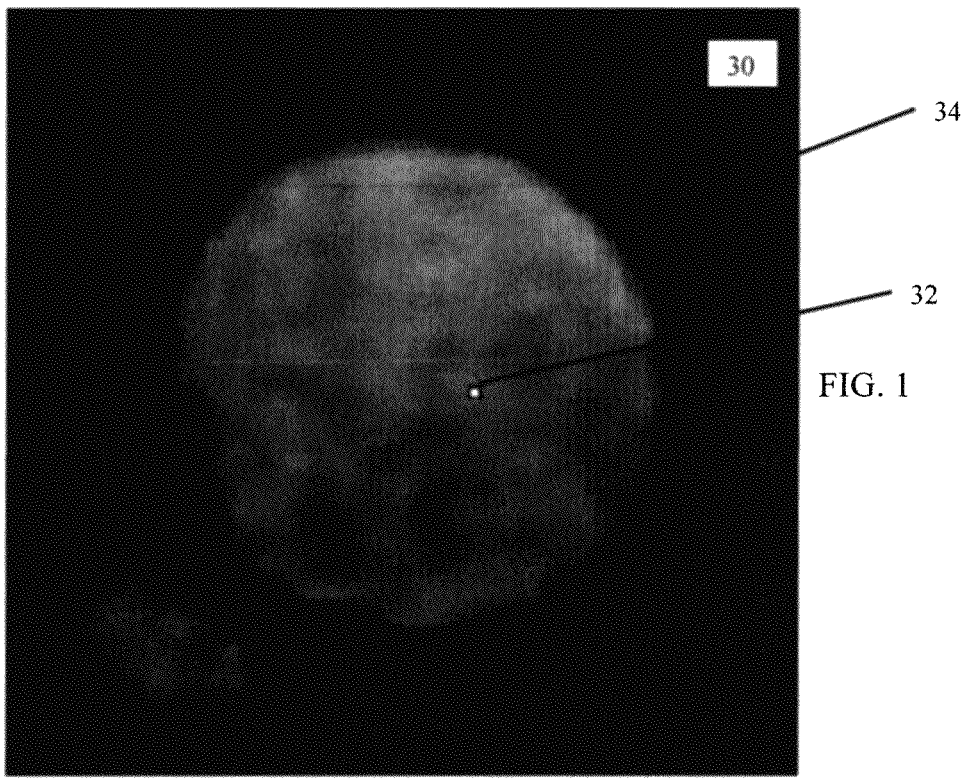
FIGS. 1 and 2 are example medical images showing detected boundaries associated with different initial seed points.
Figure 2:
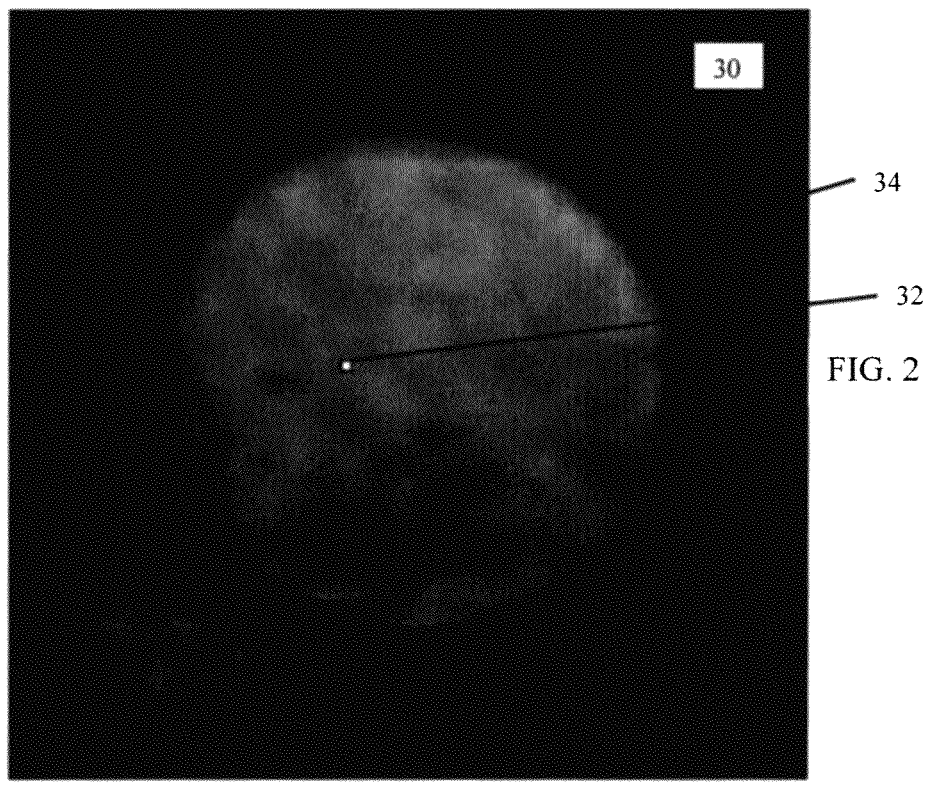
Figure 3:
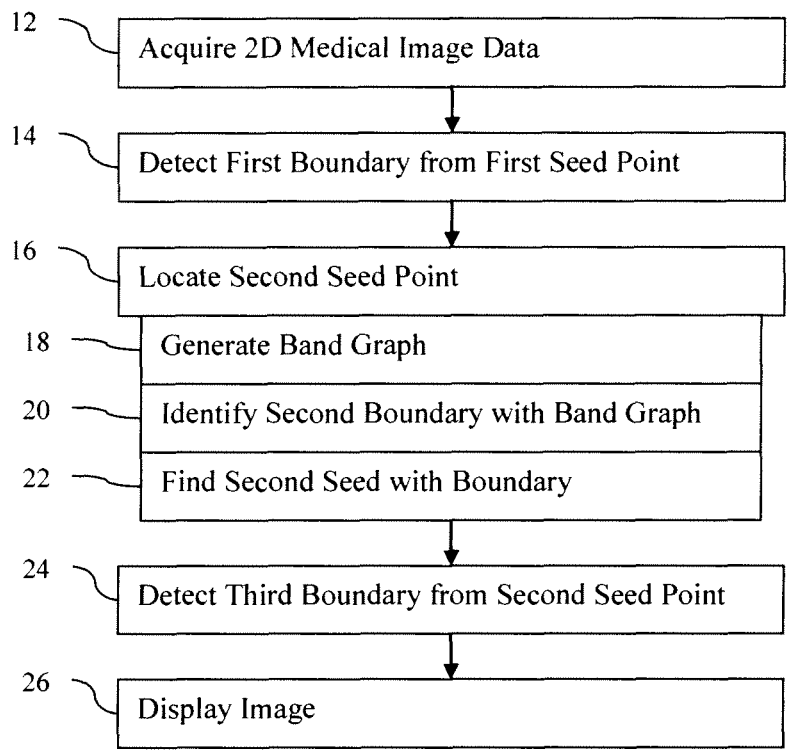
FIG. 3 is a flow chart diagram of one embodiment of a method for segmentation of a boundary.

FIG. 3 shows a flow chart of a method for segmentation of a boundary. The method is implemented by the system of FIG. 10 or another system. For example, the method is implemented on a computer or processor associated with a magnetic resonance (MR), computed tomography (CT), ultrasound, emission, x-ray or other imaging system. As another example, the method is implemented on a picture archiving and communications system (PACS) workstation or server.

The method is for segmenting a boundary. The boundary of an object is located. The segmentation may be locating, labeling, extracting, or separating. A closed boundary is segmented in one embodiment. The segmentation may follow general shapes, such as elliptical (e.g., oblong or circular) shapes associated with vessels. The shape may be constrained to remove gaps and/or avoid high frequency variation. For example, the segmentation locates an elliptical boundary. Other closed boundary shapes (e.g., organ cross-section) or semi-closed boundary shapes (e.g., heart chamber cross-section with one or more gaps for valves) may be used.

The acts are performed in the order shown or other orders. Additional, different, or fewer acts may be provided. For example, the method is performed without detecting the first boundary in act 14. The location of the seed point in act 16 is performed using a banded graph with an assumed size or user indicated size and without using the first boundary. As another example, act 26 is not performed. The boundary or quantity associated with the boundary are stored or transmitted rather than being displayed.

In act 12, a medical image is acquired. The medical image is a frame of data representing the patient. The data may be in any format. While the term image is used, the image may be in a format prior to actual display of the image. For example, the medical image may be a plurality of scalar values representing different locations in a Cartesian or polar coordinate format different than a display format. As another example, the medical image may be a plurality red, green, blue (e.g., RGB) values output to a display for generating the image in the display format. The medical image may be currently or previously displayed image in the display or other format.

Any type of medical image may be used. In one embodiment, the medical image is an angiography image, such as an MR or CT angiography image. For example, MR or CT angiography may be used for detecting a vessel boundary. As another example, phase contrast MR data representing a patient is acquired. Magnetic resonance data is acquired with an MR system. The MR data is acquired using an imaging sequence of pulses for scanning a patient. In response to application of magnetic fields and one or more pulses, data representing an interior region of a patient is acquired. The magnetic resonance data is k-space data. Fourier analysis is performed to reconstruct the data from the k-space into object or image space.

The medical image represents flow, velocity, or fluids within the patient. Alternatively, the medical image represents tissue or bone structure of the patient. In other embodiments, the medical image represents both flow and structure.

The medical image represents a one, two, or three-dimensional region of the patient. For example, the medical image represents an area or slice of the patient. Values are provided for each of multiple locations distributed in two or three dimensions. The medical image is acquired as a frame of data. The frame of data represents the scan region at a given time or period.

In act 14, an initial boundary is detected in the medical image. The image represents the patient, so the initial boundary is of a flow region or structure within the patient. For example, a vessel cross-section boundary is detected. The boundary is a two-dimensional closed shape, but three-dimensional and/or non-closed shapes may be detected.

The detection is semi-automatic. A processor detects the boundary based on user input of less than the entire boundary. For example, the user inputs one or more points along and/or within the expected boundary. In one embodiment, the user selects one or a single point and no others. The single point is within the expected boundary. For example, the user selects within or at an estimated center of a flow region or structure for which the boundary is to be detected. The user selects the seed point on a displayed medical image. A manual input, such as a mouse or track ball, is used to select the seed point.

In other embodiments, the detection is automatic. A processor identifies the seed point. For example, the processor locates a large contiguous region of similar values. The center of the region, a location of maximum velocity or flow energy, or other location is set based on the region.

Based on the seed point, a boundary of the structure or flow region is found. The processor uses the seed point to locate the boundary of the enclosing shape. Any boundary detection may be used. For example, a region growing based on intensities where the seed point is considered a representative intensity is used. As another example, a gradient-based region growing is used. In yet another example, radii from the seed point are examined to find a gradient or an intensity change above a threshold.

In one embodiment, the initial boundary is extracted from the medical image with minimum mean cycle boundary detection, such as disclosed in U.S. Published patent application No. 2007/0248250. The minimum mean cycle boundary is optimized to find the boundary in the two-dimensional image from the seed point. A cyclic graph is applied with multi-scale mean-shift boundary responses. For a two-dimensional boundary, a seed point is placed at an estimate of a center of the vessel. A cyclic graph is constructed around the seed point in the plane of the image. The graph comprises a plurality of nodes, with edges connecting the nodes. The nodes are disposed at equally spaced intervals about each one of a circumference of plurality of concentric circles centered at the seed point. Filtering, such as multi-scale mean shift intensity detection, is applied orthogonal to the edges of the cyclic graph to thereby estimate a boundary of the vessel. The process is or is not repeated. For example, a new center of the estimated boundary is determined to thereby generate a new seed point. Using the new seed point, another iteration of the boundary is located until the new seed point is at the same or within a threshold distance of the previous seed point. The boundary of the final iteration is output.

Figure 4:
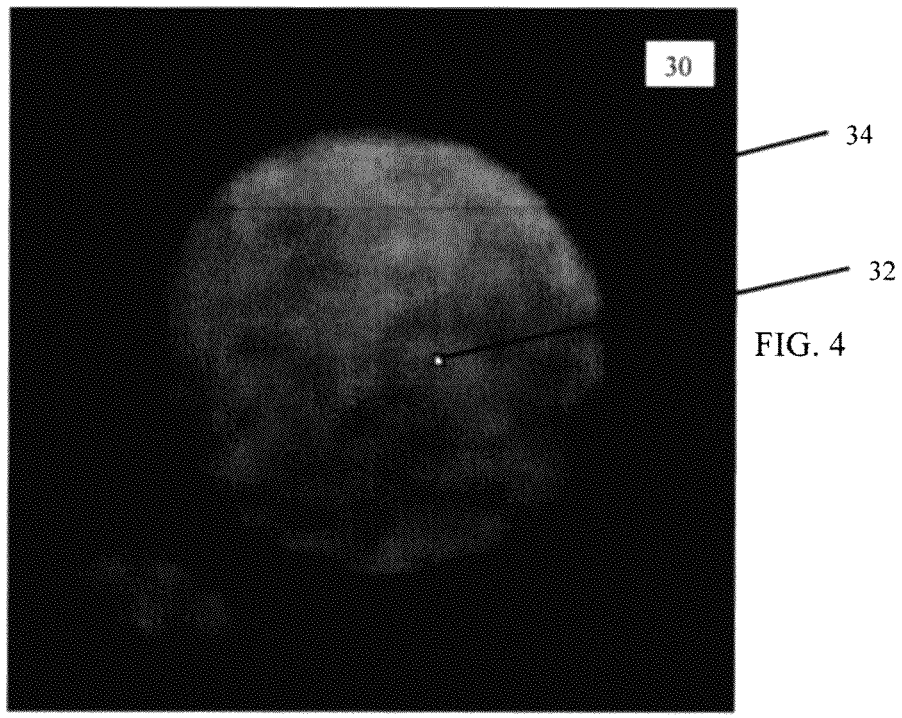
FIG. 4 is an example medical image showing an initial seed point and corresponding initial boundary.

FIG. 4 shows a medical image 30. The medical image 30 includes a flow region represented by the lighter intensities. The seed point 32 is manually placed by a user in the flow region. Based on the seed point 32, the processor detects an initial boundary 34. The initial boundary 34 is a first boundary, intermediate boundary, or a final boundary output by the boundary detection.

Since the detected boundary 34 is influenced by the position of the initial seed point 32, an intermediate act 16 of locating another seed point is provided. The location for the further seed point is based on the initial boundary. Local segmentation is performed as a function of the initial boundary. The local segmentation may include jagged or rough boundaries with or without gaps, so may not be ideal for final boundary detection. The local segmentation is instead used to locate a seed point consistently.

Any local segmentation may be used. A local segmentation may be faster, not use iteration, and/or be more likely to converge. In the example of FIG. 3, the local segmentation generates a banded graph in act 18, identifies the boundary using the banded graph in act 20, and finds the refined seed point with the identified boundary in act 22. The boundary identified in act 20 is the same boundary as detected in act 14 in the sense of trying to find the same border of an object, but may be at different locations within the medical image due to the different process used for boundary detection. Additional, different, or fewer acts may be provided for local segmentation. For example, a gradient or intensity based method or filter for refining the boundary 34 output in act 14 based on the medical image may be used.

In act 18, a banded grid graph is constructed. The banded grid graph is used for identifying graph cuts separating the graph into a region outside the local segmentation boundary and a region inside the local segmentation boundary. Different cuts of the graph may be tested to find the graph cut with a desired characteristic.

Figure 5:
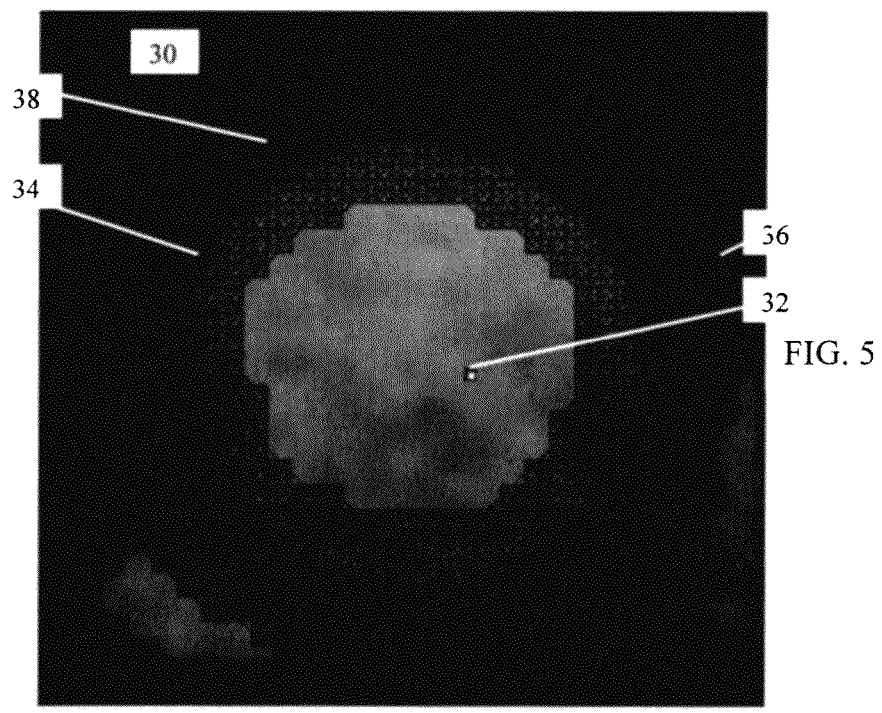
FIG. 5 is the example medical image of FIG. 4 showing a band graph used to find another boundary.

The banded grid graph includes a grid of interconnected nodes. Any size grid may be used. Any interconnections may be used. FIG. 5 shows the grid as a rectangular grid with horizontal, vertical, and diagonal (e.g., 45 degree) interconnections. Hexagonal or other grid patterns may be used. Fewer interconnections may be used, such as not providing diagonals. In other embodiments, additional diagonals at non-45 degree angles are included. Alternatively, nodes without interconnections are used.

The grid graph is banded. The graph has an inner and outer border, such as shown by the graph 36 of FIG. 5. The inner and outer borders create a band of the grid graph. The band is positioned around the initial boundary 34. Using the initial boundary 34, a band region is determined. For example, an average diameter is calculated using any step size in the sampling angles. The inner border is set relative to the average diameter, such as being at least one third or less than four fifths of the diameter. Other sizes may be used. In another example, the area is used instead of the diameter. The inner border is set to leave a particular size area. The interior of the inner border is without the graph.

Similarly, the outer border is set to be greater than the diameter, such as being about 1⅓ to 1⅘ the diameter of the initial border. In other embodiments, the inner and outer borders correspond to a distance or number of pixels away from the initial boundary 34. The inner and outer borders may have any shape, such as a circular, elliptical, or irregular shape. The shape may track the shape of the initial border 34.

With the band assigned, the graph grid is positioned within the band. Nodes are regularly spaced within the band. The interconnections of the nodes form edges. The edges are regularly distributed in the band region between adjacent nodes, such as shown in the example of FIG. 5. Other banded graphing may be used.

In act 20, the banded graph is used to identify the boundary. The initial boundary from act 14 is used to establish the banded graph. The boundary identified by the banded graph may or may not share parts or pixels with the initial boundary.

Any localization using the banded graph may be provided. The nodes or edges of the graph are used for cost minimization. A cost is assigned to each node or edge. For example, a center point of each edge segment is assigned a cost.

Any cost function may be used. For example, the intensity, a spatially filtered intensity, gradient, filtered gradient, or other value is used as a cost. In one embodiment, an edge filter is applied to intensities in a direction of a local gradient for each of the edges in the banded graph. For the center or other point along the edge, a direction of the local gradient is calculated. Any size kernel, such as a kernel about a size of a cell of the graph, is used to determine the local gradient direction. Any type of kernel, such as a Gaussian kernel, is used. The edge filter is applied along the direction from the edge, such as from a center point of the edge. The intensities from the medical image are filtered. The edge filter determines a mean shift or edge response. The change or amount of change along the direction is output by the edge filter. FIG. 5 shows a light region 38 where the edge filter output shows greater change.

The output of the edge filtering or other local cost calculation is used to cut the graph. A division of the banded graph with a minimum cost is calculated. The minimum cost is along the cut. Alternatively, the difference between the two portions of the graph formed by the cut is maximized. Where the cost is higher for edges, the cost of the cut is minimized along the cut separating the inner and outer border of the graph.

In one embodiment, the minimization finds a cut with a maximum flow approach. The minimum cost is found for a cut with a maximum flow mean. Other approaches than maximum flow may be used.

Figure 6:
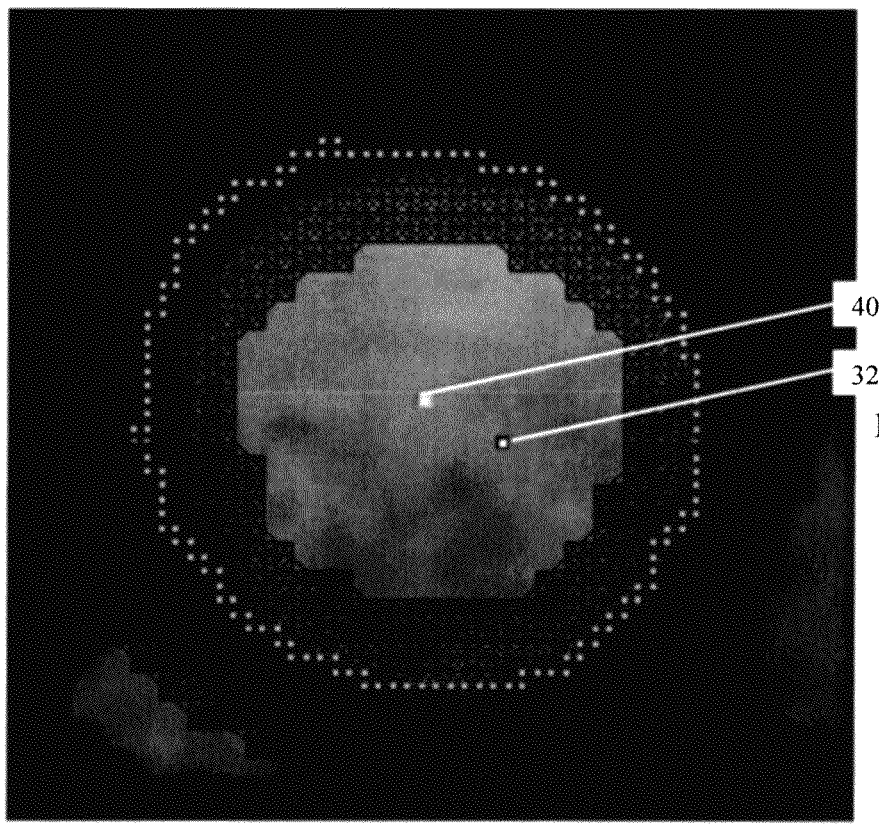
FIG. 6 is the example medical image of FIG. 5 with a new seed point location determined using the band graph.

The cut represents the local segmentation boundary. FIG. 6 shows the cut as white dots in the banded graph. The white dots are nodes connecting edges with the minimum cost. The local segmentation boundary may be a line, such as the edges interconnection adjacent nodes, in other embodiments. The local segmentation may be fitted to a line or filtered.

In act 22, the refined seed point is computed. The local segmentation boundary defines an area or volume. The refined seed point is calculated as the center of the area or volume. For example, a center of mass of the area enclosed by the local segmentation boundary is calculated. The refined seed point is computed as the center of the area. The center of mass is a geometric calculation where each pixel or location has a unit value. In other embodiments, the location of the refined seed point is other than a center, such as being at a location with a distance ratio along a diameter at an assigned angle.

FIG. 6 shows the initial seed point 32 and the refined seed point 40. The refined seed point 40 is at a center of mass of the area defined by the white dots of the local segmentation boundary.

In act 24, the boundary is detected again, but based on the refined seed point. The same or different type of boundary detection used in act 14 is performed. The boundary detection may have shape constraints or other characteristics to provide a smooth, closed form. For example, the boundary is extracted from the medical image using the minimum mean cycle optimization. A cyclic graph is applied with multi-scale mean-shift edge responses. The cycle with the desired characteristics is selected over any number of iterations and output as the boundary.

Figure 7:
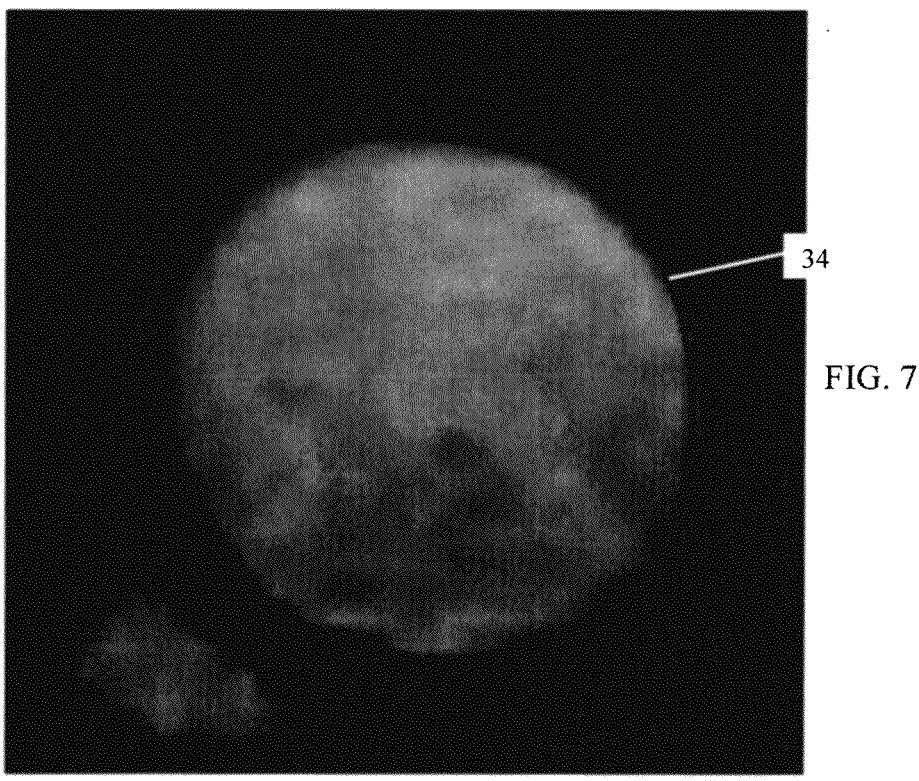
FIG. 7 is the example medical image of FIG. 4 but with a boundary detected based on the new seed point location shown in FIG. 6.
Figure 8:
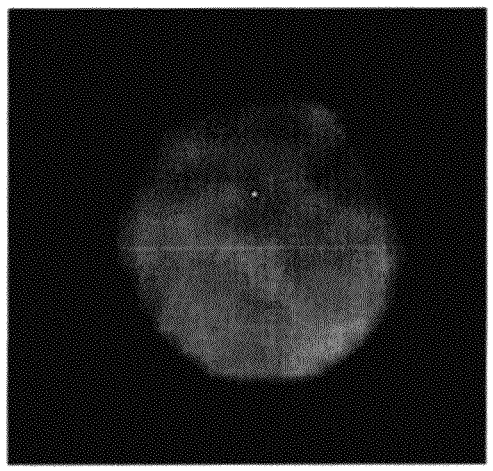
FIGS. 8 and 9 correspond to the medical images of FIGS. 1 and 2 with the different initial seed points but with consistent boundaries due to the local segmentation represented in FIGS. 5 and 6.
Figure 9:
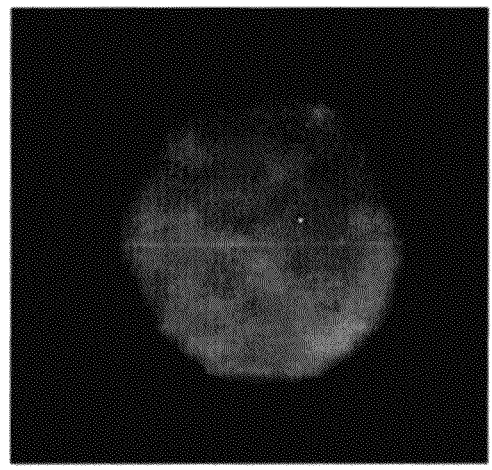

Due to the difference in the seed location, the boundary extraction may provide a different boundary than output for the initial application in act 14. FIG. 7 shows an example boundary 34 output from act 24. FIGS. 8 and 9 show that the boundary (dark line) is substantially the same regardless of the location of the initial seed (white dot). Substantially accounts for variation by one or two pixels. By using the normalization of the seed location, the resulting final boundary may be more reproducible.

In act 26, an image is displayed. The image is a function of the boundary output in act 24. The image may be the medical image with the boundary overlaid. For example, a color (e.g., blue or red) or graphic is used to highlight the boundary on the medical image, such as shown in FIG. 7.

In another embodiment, the image includes text. The text represents a calculated quantity. The boundary is used for calculating the quantity, such as an area, an amount of stenosis, a volume flow, or other quantity derived from the boundary. A combination of the medical image with the boundary and text for a quantity may be output as the image.

The image is displayed on a display of a medical imaging system, such as an MR or CT system. Alternatively, the image is displayed on a workstation, computer or other device. The image may be stored in and recalled from a PACS memory.

The output may be provided as part of any application. For example, the output is part of a vessel analysis application. Other applications may be vessel segmentation tools, blood flow tools, or vessel analysis applications. For example, the boundary segmentation is part of an application for cardiovascular assessment to assist radiologists.

Figure 10:
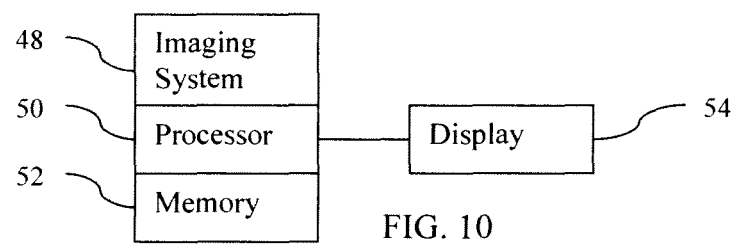
FIG. 10 is one embodiment of a system for segmentation of a boundary.

FIG. 10 shows a system for segmentation of a boundary. The system includes an imaging system 48, a memory 52, a processor 50, and a display 54. Additional, different, or fewer components may be provided. For example, a network or network connection is provided, such as for networking with a medical imaging network or data archival system. In another example, a user interface is provided.

The processor 50 and display 54 are part of a medical imaging system 48. Alternatively, the processor 50 and display 54 are part of an archival and/or image processing system, such as associated with a medical records database workstation or server. In other embodiments, the processor 50 and display 54 are a personal computer, such as desktop or laptop, a workstation, a server, a network, or combinations thereof. The processor 50, display 54, and memory 52 may be provided without other components for acquiring data by scanning a patient.

The imaging system 48 is a medical diagnostic imaging system. Ultrasound, computed tomography (CT), x-ray, fluoroscopy, positron emission tomography, single photon emission computed tomography, and/or magnetic resonance (MR) systems may be used. The imaging system 48 may include a transmitter and includes a detector for scanning or receiving data representative of the interior of the patient.

In one embodiment, the imaging system 48 is a CT system. An x-ray source is connected with a gantry. A detector is also connected with a gantry opposite the x-ray source. The patient is positioned between the source and detector. The source and detector are on opposite sides of the patient and rotate about the patient. The detected x-ray energy passing through the patient is converted or transformed into data representing different spatial locations within the patient.

In another embodiment, the imaging system 48 is a MR system. The MR system includes a main field magnet, such as a cryomagnet, and gradient coils. A whole body coil is provided for transmitting and/or receiving. Local coils may be used, such as for receiving electromagnetic energy emitted by atoms in response to pulses. Other processing components may be provided, such as for planning and generating transmit pulses for the coils based on the sequence and for receiving and processing the received k-space data. The received k-space data is converted into object or image space data with Fourier processing.

The memory 52 may be a graphics processing memory, a video random access memory, a random access memory, system memory, cache memory, hard drive, optical media, magnetic media, flash drive, buffer, database, combinations thereof, or other now known or later developed memory device for storing data or video information. The memory 52 is part of the imaging system 48, part of a computer associated with the processor 50, part of a database, part of another system, a picture archival memory, or a standalone device.

The memory 52 stores data representing a region of a patient. The region is a two or three-dimensional region. The region is of any part of the patient, such as a region within the chest, abdomen, leg, head, arm, cardiac system, heart, vessel, or combinations thereof. The data is from scanning the region by the imaging system 48. The memory 52 may alternatively or additionally store data during processing, such as storing seed locations, detected boundaries, gradient information, banded graph information, graphic overlays, quantities, an output image, or other information discussed herein.

The memory 52 or other memory is alternatively or additionally a non-transitory computer readable storage medium storing data representing instructions executable by the programmed processor 50 for segmentation of a boundary. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multi-processing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 50 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for segmentation of a boundary. The processor 50 is a single device or multiple devices operating in serial, parallel, or separately. The processor 50 may be a main processor of a computer, such as a laptop or desktop computer, or may be a processor for handling some tasks in a larger system, such as in an imaging system. The processor 50 is configured by instructions, design, hardware, and/or software to perform the acts discussed herein.

The processor 50 is configured to extract an initial boundary using boundary detection, such as using a minimum mean cycle based method. The initial boundary is extracted from a two-dimensional image based on a seed point. The processor 50 performs a local segmentation using the extracted initial boundary. For example, a banded grid graph is constructed around the initial boundary. Costs for the edges of this graph are computed by applying an edge filter in the direction of the local gradient. The cut or division of the graph with minimum cost is found using a max-flow algorithm. For the output of any local segmentation approach, such as the banded graph cut, the processor 50 computes a new seed point, such as computing a center of mass of the cut. The processor 50 extracts the final boundary using the new seed point. For example, the processor 50 applies the same minimum mean cycle based method, but using the newly computed seed point. The processor 50 may generate an output based on the final boundary.

The display 54 is a monitor, LCD, projector, plasma display, CRT, printer, or other now known or later developed devise for outputting visual information. The display 54 receives images, graphics, text, quantities, or other information from the processor 50, memory 52, or imaging system 48. One or more medical images are displayed. The images are of a region of the patient. In one embodiment, the images are phase contrast MR images. The image includes an indication, such as a graphic or colorization, of the boundary. Alternatively or additionally, the image includes a quantity based on the boundary. The quantity may be displayed as the image without the medical image representation of the patient.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for segmentation of a boundary, the method comprising:
   detecting, by a processor, a first boundary in a medical image representing a patient, the detecting of the first boundary being a function of an input point;
   generating, by the processor, a banded graph based on the first boundary;
   identifying, by the processor, a second boundary with the banded graph;
   locating, by the processor, a center of an area or volume defined by the second boundary;
   detecting, by the processor, a third boundary in the medical image as a function of the center; and
   displaying a second image as a function of the third boundary.

2. The method of claim 1 wherein detecting the first boundary in the medical image comprises detecting a vessel cross-section boundary in a magnetic resonance or computed tomography two-dimensional image and wherein the input point is a manually selected point on the two-dimensional image.

3. The method of claim 1 wherein detecting the first boundary comprises extracting the first boundary with a minimum mean cycle optimization.

4. The method of claim 1 wherein generating the banded graph comprises generating the banded graph with an inner region without the banded graph comprising at least one third and less than four-fifths of an area defined by the first boundary.

5. The method of claim 1 wherein generating the banded graph comprises assigning a plurality of edges between adjacent nodes regularly distributed in a band region covering both inner and outer regions relative to the first boundary.

6. The method of claim 1 wherein identifying the second boundary comprises applying an edge filter in a direction of a local gradient for each of a plurality of edges in the banded graph.

7. The method of claim 1 wherein identifying the second boundary comprises locating a division of the banded graph with a minimum cost using a maximum flow minimum cut.

8. The method of claim 1 wherein detecting the first boundary, identifying the second boundary, and detecting the third boundary comprise locating elliptical boundaries.

9. The method of claim 1 wherein locating the center comprises locating a center of mass.

10. The method of claim 1 wherein detecting the third boundary comprises extracting, from the medical image, the third boundary with a minimum mean cycle optimization.

11. The method of claim 1 wherein displaying comprises displaying the second image as the medical image with the third boundary highlighted.

12. The method of claim 1 wherein displaying comprises displaying the second image as a quantity calculated using the third boundary.

13. In a non-transitory computer readable storage medium having stored therein data representing instructions executable by a programmed processor for segmentation of a boundary, the storage medium comprising instructions for:
   extracting an initial boundary with minimum mean cycle edge detection from a two-dimensional image and a first seed point;
   performing local segmentation as a function of the initial boundary;
   computing a second seed point as a function of the local segmentation; and
   extracting a boundary segment with the minimum mean cycle edge detection from the two-dimensional image and the second seed point.

14. The non-transitory computer readable storage medium of claim 13 wherein performing local segmentation comprises:
   constructing a banded grid graph around the initial boundary;
   applying an edge filter in a direction of a local gradient for edges of the banded graph; and
   finding a cut with a minimum cost with a max-flow approach, the costs being a function of the output of the edge filter;
   wherein the cut is the local segmentation.

15. The non-transitory computer readable storage medium of claim 13 wherein computing comprises computing the second seed point as a center of mass of an area defined by the local segmentation.

16. The non-transitory computer readable storage medium of claim 13 wherein extracting with the minimum mean cycle edge detection comprises applying a cyclic graph with multi-scale mean-shift edge responses.

17. In a non-transitory computer readable storage medium having stored therein data representing instructions executable by a programmed processor for segmentation of a boundary, the storage medium comprising instructions for:

finding a first boundary of an enclosed shape with a first seed point within the enclosed shape;
locating, with banded graph-cuts, a location for a second seed point as a function of the first boundary;
finding a second boundary of the enclosed shape with the second seed point.

18. The non-transitory computer readable storage medium of claim 17 wherein finding the first boundary comprises finding the first boundary with the first seed point being a single user input of position relative to the enclosed shape on a two-dimensional medical image.

19. The non-transitory computer readable storage medium of claim 17 wherein finding the first and second boundaries comprises extracting with minimum mean cycle optimization.

20. The non-transitory computer readable storage medium of claim 17 wherein locating comprises:
constructing a banded grid graph around the first boundary;
applying an edge filter in a direction of a local gradient for edges of the banded graph; and
finding a cut of the banded graph-cuts with a minimum cost with a max-flow approach, the cost being a function of the output of the edge filter.

* * * * *